(12) United States Patent
Tsuru et al.

(10) Patent No.: US 8,756,347 B2
(45) Date of Patent: Jun. 17, 2014

(54) IMAGE DISPLAY APPARATUS, MONITOR APPARATUS AND IMAGE PROCESSING APPARATUS

(75) Inventors: Yasutaka Tsuru, Yokohama (JP); Yuya Ogi, Yokohama (JP); Nobuaki Kabuto, Kunitachi (JP); Takeo Hioki, Yokohama (JP); Kenya Kasahara, Yokohama (JP); Kuninori Matsumi, Yokohama (JP); Toyoshige Ohshika, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 477 days.

(21) Appl. No.: 12/327,834

(22) Filed: Dec. 4, 2008

(65) Prior Publication Data

US 2009/0207307 A1 Aug. 20, 2009

(30) Foreign Application Priority Data

Dec. 7, 2007 (JP) ................................. 2007-316529

(51) Int. Cl.
*G06F 3/00* (2006.01)
*G06F 13/00* (2006.01)
*H04N 21/4367* (2011.01)
*H04N 21/4363* (2011.01)
*H04N 21/436* (2011.01)
*H04N 21/443* (2011.01)

(52) U.S. Cl.
CPC ..... *H04N 21/4367* (2013.01); *H04N 21/43632* (2013.01); *H04N 21/43615* (2013.01); *H04N 21/4432* (2013.01); *G09G 2370/06* (2013.01); *G09G 2370/12* (2013.01)
USPC .......... 710/14; 710/5; 710/8; 710/15; 710/16; 710/104

(58) Field of Classification Search
CPC .................... H04N 21/4367; H04N 21/43632; H04N 21/43615; H04N 21/4432; H04N 21/06; H04N 21/12; G09G 2370/06; G09G 2370/12
USPC ................................. 710/5, 8, 10, 14–16, 104
See application file for complete search history.

(56) References Cited

U.S. PATENT DOCUMENTS 7,436,415 B2 10/2008 Takata et al.
2008/0074411 A1* 3/2008 Yamashita ..................... 345/211

(Continued)

FOREIGN PATENT DOCUMENTS

| JP | 2005-086721 | 3/2005 |
| JP | 2005-157948 | 6/2005 |
| WO | WO 2007/072821 A1 | 6/2007 |

OTHER PUBLICATIONS

HDMI Specification version 1.3 Jun. 22, 2006 PDF Format: http://read.pudn.com/downloads124/sourcecode/others/525263/HDMI_Spec_1.3_GM1.pdf.*

(Continued)

*Primary Examiner* — Henry Tsai
*Assistant Examiner* — Eric Oberly
(74) *Attorney, Agent, or Firm* — Antonelli, Terry, Stout & Kraus, LLP.

(57) ABSTRACT

According to our invention, linked operation between a monitor apparatus for displaying images, and a set-top box for transmitting image signals to the monitor apparatus via a required interface, can be achieved properly, even if both units are constructed in casings separate from each other. The monitor apparatus uses a CEC line to transmit a CEC vendor command including at least a code associated with unit information, and the set-top box apparatus transmits the CEC vendor command including at least the code associated with the unit information. Upon receiving the vendor command from the set-top box apparatus, the monitor apparatus switches to the linked operation with the set-top box.

8 Claims, 4 Drawing Sheets

(56) References Cited

U.S. PATENT DOCUMENTS

| | | | |
|---|---|---|---|
| 2008/0126591 A1* | 5/2008 | Kwon | 710/15 |
| 2008/0170164 A1* | 7/2008 | Park | 348/734 |
| 2008/0172504 A1* | 7/2008 | Kimura et al. | 710/63 |
| 2008/0244097 A1* | 10/2008 | Candelore et al. | 710/5 |
| 2009/0174821 A1 | 7/2009 | Matsuo et al. | |
| 2009/0284536 A1* | 11/2009 | Yoshida | 345/520 |
| 2009/0290065 A1* | 11/2009 | Asayama et al. | 348/553 |

OTHER PUBLICATIONS

Japanese Office Action dated Oct. 16, 2013; Application No. JP2007-316529; 2 pages.

* cited by examiner

IMAGE DISPLAY APPARATUS, MONITOR APPARATUS AND IMAGE PROCESSING APPARATUS

CLAIM OF PRIORITY

The present application claims priority from Japanese patent application serial no. JP 2007-316529, filed on Dec. 7, 2007, the content of which is hereby incorporated by reference into this application.

BACKGROUND OF THE INVENTION (1) Field of the Invention

The present invention relates to a technique for operating a monitor apparatus and an image processing apparatus properly in an image display apparatus configuration established with both the monitor apparatus and the image processing apparatus housed in casings separate from each other, and interconnected via an interface.

(2) Description of the Related Art

In some of image display apparatuses such as the TV sets using a flat panel such as a liquid-crystal display (LCD) panel or plasma display panel (PDP), the monitor apparatus including the flat panel, and the image processing apparatus including a tuner are housed in separate casings to allow, for example, wall mounting for improved flexibility of installation layout. The technique described in JP-A-2005-086721, for example, is known as one of such conventional techniques.

JP-A-2005-086721 describes a TV receiver of a form in which the image processing apparatus with the tuner and image processing unit connecting to antenna terminals (this kind of image processing apparatus is often called the "set-top box"), and the monitor apparatus including the flat panel for image display are housed in separate casings and interconnected via a special transmission cable.

SUMMARY OF THE INVENTION

In order that the set-top box apparatus and the monitor apparatus work cooperatively and operate as an integrated television receiver, both units need to recognize each other as a specific unit operable in mutually linked form. However, JP-A-2005-086721 does not disclose the configuration intended for both units to recognize whether the connecting destination is a linkedly operable unit. Connecting the set-top box and the monitor apparatus to a unit not operable in mutually linked form is not considered, either. Additionally, neither does JP-A-2005-086721 consider the following problems relating to a mismatch in power supply state between the set-top box and the monitor apparatus. That is to say, when either the set-top box or the monitor apparatus is in a power-off state, the user is usually not using the image display apparatus having the particular set-top box and monitor apparatus, but despite this, if one of the two units is powered on with the other unit off, extra power will be consumed, even when the image display apparatus is not being used. Furthermore, the linked operation discussed above may be impossible if one unit is powered off with the other unit on.

In the meanwhile, the interconnection of image units in recent years may use an interface based on the high-definition multimedia interface (HDMI) specifications intended for digital image and sound transmission (hereinafter, this interface is referred to simply as the HDMI). The HDMI is provided for by the CEC (Consumer Electric Control) communications protocol established as an interunit control communications protocol in HDMI-Specification Informational Ver. 1.0, for example.

The HDMI works so that in order for both the set-top box and the monitor apparatus to recognize each other as a unit operable in mutually linked form, the signal-transmitting unit (here, the set-top box) acquires, from the signal-receiving unit (here, the monitor apparatus), extended display identification data (EDID: manufacturer name, product code, resolution, and more) as unit information related to the signal-receiving unit. However, the monitor apparatus cannot acquire unit information about the set-top box apparatus under the HDMI scheme.

In addition, when the set-top box and the monitor apparatus are connected by an HDMI cable via a relay unit having input/output ports adapted to the HDMI, the set-top box can acquire only unit information of the relay unit and cannot acquire the unit information of the monitor apparatus. This indicates that there is the problem that the mere presence of the EDID information acquisition scheme does not allow the set-top box and the monitor apparatus to recognize each other and thus to operate as an integrated television receiver.

The present invention has been made with this problem taken into account, and an object of the invention is to provide a technique for operating properly in linked form a monitor apparatus and an image processing apparatus, both constructed as units separate from each other.

The present invention applies a required interface such as an HDMI to interconnect a monitor apparatus used for displaying images, and an image processing apparatus used for providing an input image signal with a required process and then providing an output to the monitor apparatus via the required interface. Thus, the monitor apparatus and the image processing apparatus can both receive or transmit an authentication command associated with each other, from the apparatus to which each is connected. In addition, upon receiving the authentication command, either the monitor apparatus or the image processing apparatus or both thereof transmit and receive a control signal to operate in linked form.

The monitor apparatus is constructed to receive a remote control signal from a remote controller intended to operate the image processing apparatus, and when the monitor apparatus conducts the linked operation, a command based on the remote control signal received by the monitor apparatus is transmitted as the control command to the image processing apparatus via the interface, or when the monitor apparatus operates independently, the received remote control signal is processed inside the monitor apparatus. Also, the image processing apparatus is constructed to be able to transmit a control signal for adjusting image quality, as the above control signal, to the monitor apparatus, and when the image processing apparatus conducts the linked operation, the control signal for adjusting image quality is transmitted to the monitor apparatus via the interface.

The interface is preferably the HDMI. The authentication commands and the control signal are transmitted through an internal CEC (Consumer Electric Control) line of the HDMI.

During the linked operation, a built-in image quality correction unit of the image processing apparatus and that of the monitor apparatus may be controlled in mutually linked form using the control signal.

Additionally, the present invention is constructed so that information on power on/off states of the monitor apparatus and the image processing apparatus can be transmitted and received therebetween via the interface and so that respective power supplies of both units are controlled for matching in power on/off state. For example, when the power supply of either the monitor apparatus or the image processing apparatus is on, the power supply of the other unit is turned on, and when the power supply of either unit is off, the power supply of the other unit is turned off. Power on/off matching control between the units is conducted using the authentication command transmitted and received therebetween, and power on/off control is permitted when authentication with the authentication command is conducted in the monitor apparatus or the image processing apparatus.

Adopting this apparatus configuration establishes a system in which the image processing apparatus and the monitor apparatus become linked to operate an integrated television receiver.

According to the present invention, an image processing apparatus and monitor apparatus constructed as units separate from each other can be operated properly in linked form.

BRIEF DESCRIPTION OF THE EMBODIMENT

These and other features, objects and advantages of the present invention will become more apparent from the following description when taken in conjunction with the accompanying drawings, wherein.

DETAILED DESCRIPTION OF THE INVENTION

Hereunder, embodiments of the present invention will be described referring to the accompanying drawings.
(First Embodiment)

Figure 1:
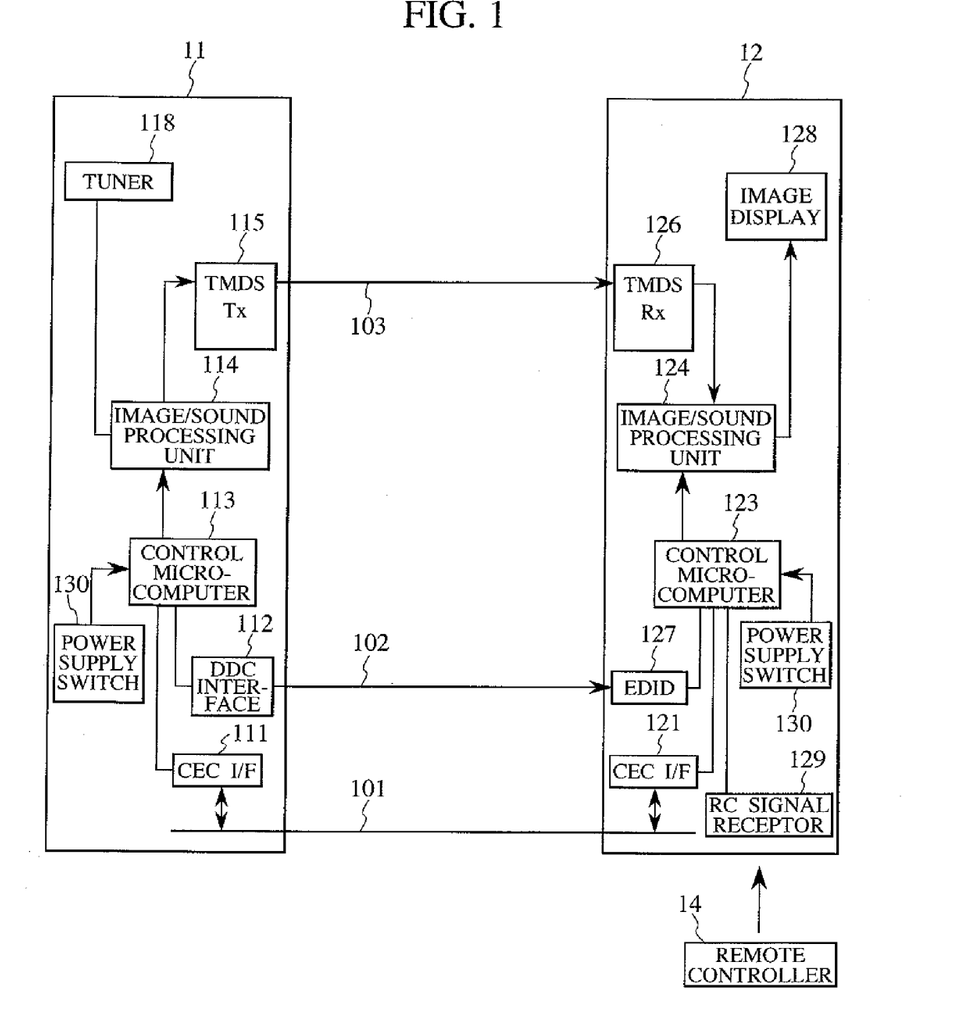
FIG. 1 is a diagram illustrating a first embodiment of the present invention.

FIG. 1 is a diagram illustrating an embodiment of the present invention. A set-top box 11 and a monitor 12 are interconnected via an HDMI cable, constructing a television receiving system that operates as an integrated image display apparatus. First, operation of the set-top box 11 which is an image processing apparatus is described below. A press of a power supply switch 110 turns on a power supply of the set-top box 11 to load (read in) EDID 127 of the monitor 12 from a DDC interface 112 and transmits the data 127 from the set-top box 11 to a control microcomputer 113. As described in HDMI-Specification Informational Ver. 1.0, the control microcomputer 113 acquires a physical address included in the EDID, and the monitor 12 acquires a corresponding image format. A tuner 118 receives an image signal such as a digital television signal. This digital television signal is already compression-coded in, for example, MPEG-2, MPEG-4, or the like. An image/sound signal processing unit 114 converts the compression-coded digital television signal into a non-compressed image signal, then further convert the non-compressed image signal into the above-mentioned image format by pixel conversion and frame rate conversion, and transmits the image format from a TMDS (Transition Minimized Differential Signaling) transmitter 115 through a TMDS line 103 of the HDMI cable to the monitor 12. Also, the acquisition of the above-mentioned physical address by the control microcomputer allows the set-top box 11 to transmit CEC commands as control signals. Therefore, the set-top box 11 transmits a polling CEC command from the CEC interface 111 to a CEC line 101 of the HDMI cable, thus defining a logical address within a CEC network. After defining the logical address, the set-top box 11 transmits CEC commands to the entire CEC network to notify it of the logical address and the physical address.

Next, operation of the monitor 12 is described below. The image signal that has been transmitted through the TMDS line 103 of the HDMI cable is received by a TMDS receiver 126, then undergoes image quality correction by an image/sound signal processing unit 124, and is displayed on an image display 128. During the image quality correction process, control from a control microcomputer 123 determines a correction level. Since the physical address of the monitor 12 is predetermined, the CEC commands as control signals can be transmitted once the control microcomputer 123 has started operating. Accordingly, a polling CEC command is transmitted from a CEC interface 121 to the CEC line 101 of the HDMI cable and a logical address within a CEC bus system is defined. After the definition of the logical address, CEC commands are transmitted to the entire CEC network to notify it of the logical address and the physical address.

The monitor 12 has a remote control signal receptor 129 to receive a remote control signal transmitted from a remote controller 14 for operating or controlling the television receiving system, and the monitor 12 can activate its own power supply using a power supply ON signal transmitted from the remote controller 14.

Figure 2:
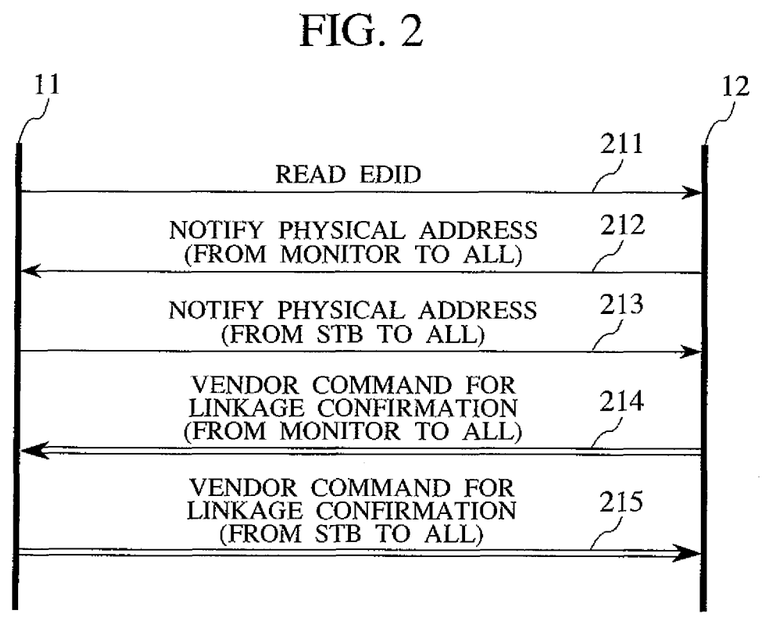
FIG. 2 is a diagram illustrating a linkage authentication command flow of the first embodiment of the present invention.

Next, linked authentication of the set-top box 11 and monitor 12 is described below. FIG. 2 is a diagram that illustrates linked authentication. Reference number 11 in FIG. 2 denotes the set-top box 11, and reference number 12 denotes the monitor 12. First, the set-top box 11 executes an EDID read operation 211 for the monitor 12. Almost concurrently with this, the monitor 12 issues a command 212 to the entire CEC network to notify it of the logical address "TV" and the physical address. The set-top box 11 receives the command 212 and understands that a unit whose logical address is "TV" is present. After this, the set-top box 11, upon the definition of the physical address and the logical address, issues a command 213 to the entire CEC network to notify it of a logical address "Tuner" and a physical address. The monitor 12 receives the command 213 and understands that a unit whose logical address is "Tuner is present. The commands 212 and 213 are also issued from other logical address "TV" units and physical address "Tuner" units, and linked authentication is not established because both units have recognized the presence of each other.

The issuance of the command 213 allows the monitor 12 to understand that the logical address "Tuner" unit has become ready to transmit and receive CEC commands (i.e., that the "Tuner" unit has become able to operate in linked form with the "TV" unit), so the monitor 12 issues a linked authentication CEC vendor command 214 that indicates a linkedly operable, specific unit. Upon receiving the vendor command 214, the set-top box 11 linkedly operable with the monitor 12 recognizes through the CEC network that the linkedly operable monitor is connected, and switches to a linked operation mode. In addition, the set-top box 11 issues a linked authentication CEC vendor command 215 that indicates another linkedly operable, specific unit. Upon receiving the vendor command 215, the monitor 12 recognizes that the linkedly operable set-top box is connected, and switches to the linked operation mode. These command sequences cause the set-top box 11 and the monitor 12 to enter the linked operation mode based on the CEC command transmitting and receiving via the CEC line 101, and thus to operate as the integrated television receiving system.

In the linked operation mode, the set-top box 11 and the monitor 12 can be powered on/off by operating either a power supply button of the remote controller 14, a power supply button 110 of the set-top box 11, or a power supply button 120 of the monitor 12. Details of linked control in power supply state between the set-top box 11 and the monitor 12 will be described later herein. An image quality correction level of the image/sound signal processing unit 114 of the set-top box 11, and that of the image/sound signal processing unit 124 of the monitor 12 are correction-controlled for appropriate image quality correction of respective image signals under a combined state. For example, a total image quality correction level of the image signals displayed on the monitor 12 may be predefined so that the set-top box 11 and the monitor 12 are linked for distribution of this image quality correction level to both units. For examples the image/sound signal processing unit 114 of the set-top box 11 may conduct image quality correction at nearly 10% of the total image quality correction level, and the image/sound signal processing unit 124 of the monitor 12 may conduct image quality correction at the remaining 90% of the total image quality correction level. This distribution rate may be changed according to particular signal-processing capabilities of the image/sound signal processing units 114 and 124 of the set-top box 11 and monitor 12. For example, if the image/sound signal processing unit 114 of the set-top box 11 is larger in throughput, the image quality correction level of the image/sound signal processing unit 114 may be zeroed or reduced from an original value while the image quality correction level of the image/sound signal processing unit 124 may be increased. Further alternatively, the above distribution rate may be changed according to a particular signal transmission state in the HDMI. For example, if a signal attenuation level in the HDMI is too high, the image quality correction level of the image/sound signal processing unit 114 may be zeroed or reduced and only image quality correction with the image/sound signal processing unit 124 may be conducted or the image quality correction level of the image/sound signal processing unit 124 may be increased. Otherwise, if the signal attenuation level in the HDMI is too high, both image/sound signal processing units may conduct image quality corrections at essentially the same correction level to provide a trifle strong quality correction.

Upon transmission of a menu display request signal from the remote controller 14 to the remote controller signal receptor 129 of the monitor 12, the request signal is transferred as a CEC command to the set-top box 11 via the CEC line 101, causing the set-top box 11 to create a menu screen in response to the CEC command. An image signal associated with the menu screen is combined with a non-compressed image signal and further transmitted to the monitor 12 through the TMDS line 103. Thus, the particular menu screen of the set-top box 11 is displayed on the monitor 12. A user operates the displayed menu screen using the remote controller 14. The control microcomputer 123 included in the monitor 12 then generates an appropriate process according to the kind of operation which the user has performed. Accordingly, functions of the set-top box 11 and monitor 12 are controlled at the same time. For example, if an operation for image quality adjustment such as contrast adjustment or brightness adjustment is selected on the menu screen via the remote controller 14, the control microcomputer 123 converts the remote control signal into an image quality adjusting CEC command and transmits the command to the set-top box 11 via the CEC line 101. Thus, the control microcomputer 113 included in the set-top box 11 controls the image/sound signal processing unit 114 in response to the CEC command and conducts the selected (desired) image quality adjustment. Instead, image quality adjustment may be conducted by linked operation with the image/sound signal processing unit 124 of the monitor 12, as described above. If sound volume adjustment of sounds from a loudspeaker not shown is selected on the menu screen, the control microcomputer 123 of the monitor 12 does not transmit the remote control signal as a CEC command to the set-top box 11. Instead, the control microcomputer 113 outputs the remote control signal to the image/sound signal processing unit 124 of the monitor 12. Thus, the volume of the sounds from the loudspeaker is adjusted to a desired level according to the remote control signal. In this way, in the linked operation mode, whether the control function is to be executed by the set-top box 11 or the monitor 12 is discriminated according to the particular kind of command from the remote controller, and whether a CEC command is to be issued is controlled according to a particular result of the discrimination.

Furthermore, the present embodiment offers a game-playing low-delay display mode. The image/sound signal processing units 114 and 124 conduct, for example, a frame rate conversion process for increasing a frame count per unit time of input image signals, and a scaling process for enlarging/reducing each image signal. When the frame rate conversion or the scaling process is executed, timing in which the image is displayed on the monitor 12 may be delayed by, for example, nearly several tens to several hundreds of milliseconds (ms) behind acquisition timing of the input image signal. The game-playing low-delay display mode reduces the above delay in image display by interrupting such a process (especially, the frame rate conversion). For example, if the set-top box 11 has a connected game-playing unit, when an active state of the game-playing low-delay display mode is set on the menu screen, the image/sound signal processing unit 114 of the set-top box 11 will be controlled to switch to the low-delay display mode. At the same time, the image/sound signal processing unit 124 of the monitor 12 will be controlled using a CEC vendor command to switch to the low-delay display mode. In this manner, in spite of the television receiving system being of the dual-unit configuration, the set-top box 11 and the monitor 12 can operate as if they were one integrated unit.

The set-top box 11 and the monitor 12 will each operate independently if their linked authentication ends up in failure. In that case, for example, the monitor 12 will not transfer to the set-top box 11 the remote control signal received from the remote controller 14. Instead, the internal control microcomputer 123 will control the monitor 12 only.

A way to manage the power supplies of the set-top box 11 and monitor 12 during linked operation, that is, a power supply matching control method is described below. The power supply matching control is permitted when the authentication based on such authentication commands as described above is successfully conducted, that is, the control is executed only when switching to the linked operation mode is completed.

During linked operation, the set-top box 11 and the monitor 12 both need to be powered on/off. Use of a specific control method, however, may cause mismatching in power supply state, as with one unit powered on and the other unit powered off, and trouble with the linked operation may result. To avoid these inconveniences, it is desirable that either unit should manage the power supplies of both units. In the configuration of the present embodiment, three methods exist for starting the power supplies: (1) pressing the power supply switch 110 of the set-top box 11, (2) transmitting a power ON signal from the remote controller 14 to the remote control signal receptor 129 of the monitor 12, and (3) pressing a power supply switch 130 of the monitor 12.

Figure 4A:
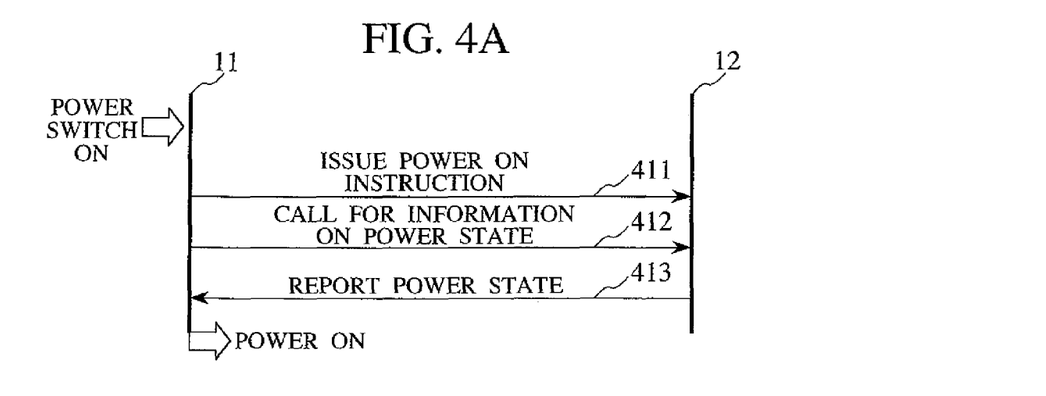
FIGS. 4A, 4B and 4C are diagrams illustrating power supply starting command flows of the first embodiment of the present invention.

First, method (1) is described below using the CEC command flowchart shown in FIG. 4A. A press of the power supply switch 110 makes the set-top box 11 to issue a CEC vendor command 411 instructing the monitor 12 to turn on the power supply. After this, the set-top box 11 issues a CEC vendor command 412 to the monitor 12 to inquire about the power supply state thereof. Upon receiving from the monitor 12 a CEC vendor command 413 indicating the power supply ON state, the set-top box 11 operates to switch its own power supply to the ON state.

Figure 4B:
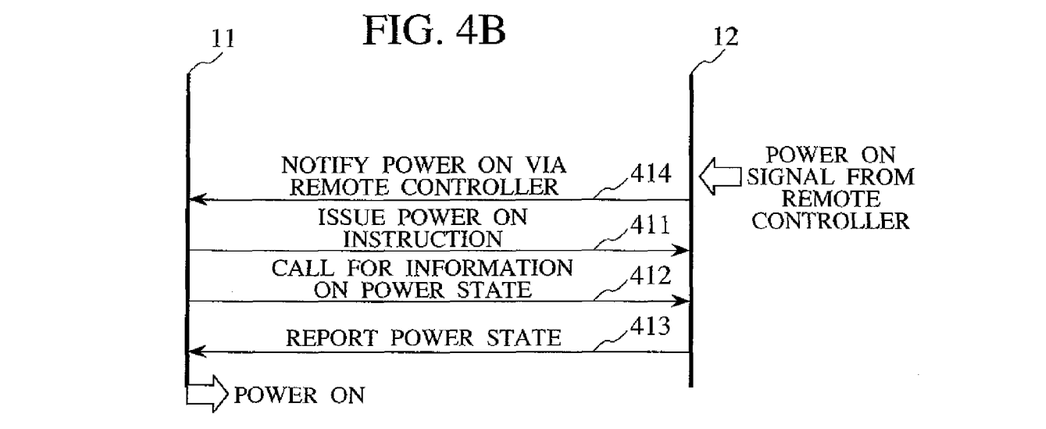

Next, method (2) is described below using the CEC command flowchart shown in FIG. 4B. Upon receiving the power ON signal from the remote controller via the remote control signal receptor 129, the monitor 12 issues a CEC vendor command 414 that indicates the reception of the remote control signal instructing the set-top box 11 to turn on its power. The set-top box 11 issues the CEC vendor command 411 instructing the monitor 12 to turn on its power. After this, the set-top box 11 issues the CEC vendor command 412 to the monitor 12 to inquire about the power supply state thereof. Upon receiving from the monitor 12 the CEC vendor command 413 indicating the power supply ON state, the set-top box 11 operates to switch its own power supply to the ON state.

Figure 4C:
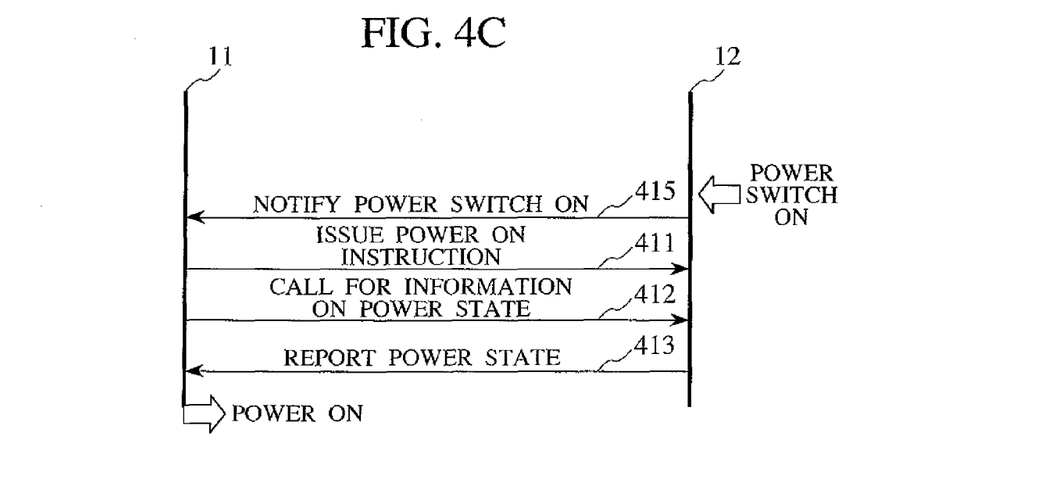

Next, method (3) is described below using the CEC command flowchart shown in FIG. 4C. A press of the power supply switch 130 causes the monitor 12 to issue to the set-top box 11 a CEC vendor command 415 indicating the switch was pressed. The set-top box 11 issues the CEC vendor command 411 instructing the monitor 12 to turn on the power. After this, the set-top box 11 issues the CEC vendor command 412 to the monitor 12 to inquire about the power supply state thereof. Upon receiving from the monitor 12 the CEC vendor command 413 indicating the power supply ON state, the set-top box 11 operates to switch its own power supply to the ON state.

In short, the monitor 12 does not immediately turn on the power, even when the power supply button 130 that the monitor has is pressed or when the monitor receives the power ON signal from the remote controller. Instead, the monitor waits for the power ON instruction from the set-top box before turning on the power. Additionally, the set-top box 11, before switching itself to the power ON state, makes sure that the monitor 12 has switched to the power ON state. In this way, mismatching in power supply state can be avoided since the set-top box 11 provides integrated management of the power supply states inclusive of the power state of the monitor 12 operating in linked form with the set-top box. While switching to the power ON state has been described, shifting to the power OFF state is also controlled in like manner and can be accounted for by reading "power OFF" for the "power ON" state in the above description.

As set forth above, in the present embodiment, the set-top box 11 and the monitor 12 authenticate each other by receiving the unit-associated authentication command from the connection destination unit, and the two units require authentication before the linked operation of both is permitted. Thus, only when connection is established between the specific units whose linked operation has been permitted, the linked operation can be implemented between these units, with the result that both can operate properly in linked form in the television receiving system. This linked operation allows improvement of mismatching in power supply state between the set-top box 11 and the monitor 12, and hence, improvement of extra power consumption and trouble relating to the linked operation.

While the linked operation in the embodiment described above is permitted only when the set-top box 11 and the monitor 12 are both successfully authenticated, the linked operation may be permitted even when either unit only is authenticated. This authentication is preferably conducted at least at the monitor side. In addition, while the television receiving system has been described by way of example, the present invention is not limited to this system and can, of course, be applied to an apparatus that outputs image signals as set forth above, and to a system that displays images by receiving the image signals.

(Second Embodiment)

Figure 3:
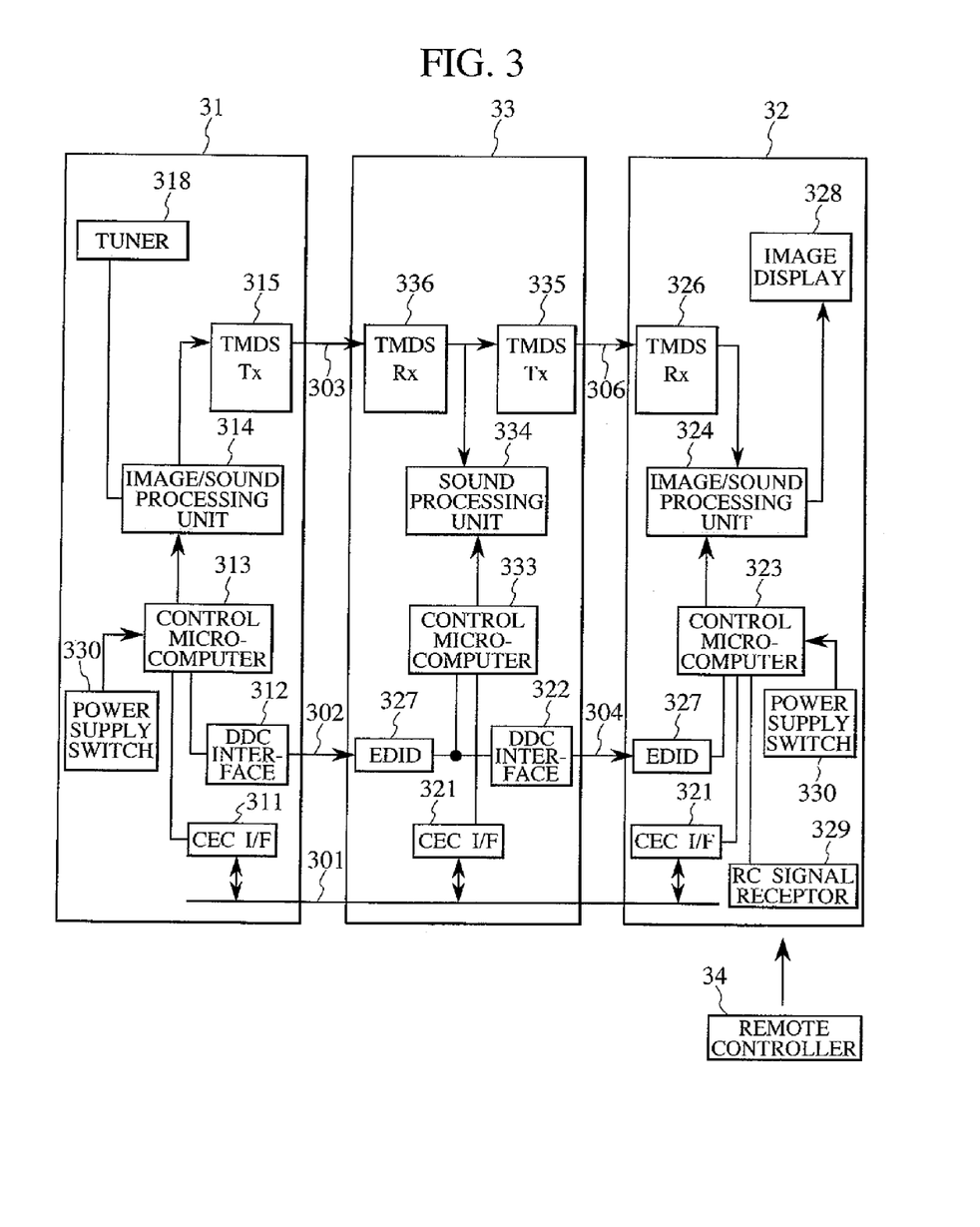
FIG. 3 is a diagram illustrating a second embodiment of the present invention.

The following describes a second embodiment of the present invention. FIG. 3 is a diagram illustrating an example in a second embodiment of the present invention. The present embodiment includes a sound amplifier unit 33 inserted between the set-top box 11 and monitor 12 of the first embodiment via the HDMI. This sound amplifier unit 33 is connected to a plurality of loudspeakers, for example, and outputs sound signals from each of the connected speakers, in collaboration with the speaker originally provided in the monitor 12, or in place of a speaker of a monitor 32. The set-top box 31 and monitor 32 shown in FIG. 3 are substantially the same units, including respective internal configurations, as the set-top box 11 and monitor 12 described and shown in FIG. 1.

Referring to FIG. 3, the sound amplifier unit 33 uses a TMDS receiver 336 to receive a TMDS signal from the set-top box 31, and outputs the TMDS signal directly from a TMDS transmitter 335. In addition, the sound amplifier unit 33 extracts a sound signal present in duplexed form in the TMDS signal, and uses a sound-processing unit 334 to process the extracted sound signal under control from a control microcomputer 333. The sound amplifier unit 33 acquires EDID of the monitor 32 via a DDC interface and incorporates a physical address and monitor-acceptable image format information into the EDID 327. The set-top box 31 and the monitor 32 transmit and receive CEC commands via a CEC interface 321.

The present embodiment differs from the first embodiment in that since the sound amplifier unit 33 is connected between the set-top box 31 and the monitor 32, the set-top box 31 cannot directly acquire the EDID of the monitor 32. Even in this connection configuration, however, the present embodiment allows the set-top box 31 to acquire the EDID of the monitor 32, since the EDID is stored into the sound amplifier unit 33 temporarily and then transmitted to the set-top box 31 via the CEC interface. Thus, in order that a linked authentication process for the set-top box 31 and the monitor 32 is achieved in the CEC vendor command flow sequence described per FIG. 2, linked operation can be implemented, even in the connection state that does not allow direct acquisition of the EDID.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An image display apparatus comprising:
a monitor apparatus configured to display images, the monitor apparatus including a first power supply switch; and
an image processing apparatus including: a tuner configured to receive a compressed and encoded digital television signal, a second power supply switch, and a controller section including a recognizing section configured to recognize the monitor apparatus connected to the image processing apparatus, the image processing apparatus configured to:
convert the compressed and encoded digital television signal received by the tuner into a decompressed and decoded image signal, and
output the decompressed and decoded image signal to the monitor apparatus via a required interface; and
a remote controller including a third power supply switch arranged therein, the third power supply switch configured to operate any one of the monitor apparatus and the image processing apparatus;
wherein each of the monitor apparatus and the image processing apparatus are configured in separate casings;
wherein the monitor apparatus is configured to issue a linked authentication Consumer Electronics Control (CEC) vendor command to the image processing apparatus;
wherein the image processing apparatus is configured to issue a linked authentication CEC vendor command to the monitor processing apparatus;
wherein the monitor apparatus and the image processing apparatus are configured to operate in a linked operation mode,
wherein when the monitor apparatus and the image processing apparatus recognize the respectively issued linked authentication CEC vendor command, the monitor apparatus and the image processing apparatus are configured to switch to linked operation mode;
wherein when the monitor apparatus and the image processing apparatus are in linked operation mode, upon power on operation of anyone of the first, second and third power supply switches, the controller section is configured to:
transmit a power on command in response to the power on operation to the monitor apparatus via the required interface to turn on the monitor apparatus,
issue an inquiring command to the monitor apparatus to obtain information on the power state of the monitor apparatus,
receive, from the monitor apparatus, information on a state of power supply of the monitor apparatus controlled by the power on command, which is obtained in response to the inquiring command, and
ensure that the monitor apparatus has been turned on based on the received information on the state of power supply of the monitor apparatus, and then control turning on the image processing apparatus,
thereby, even when anyone of the first, second, and third power supply switches is operated, the controller section controls the power supply of the monitor apparatus and the power supply of the image processing apparatus in operation with each other, in such a way that both power supply states become equal.

2. The image display apparatus according to claim 1, wherein when anyone of the first, second, and third power supply switches is turned off, the controller section is configured to control both the power supplies of the monitor apparatus and the image processing apparatus in operation with each other, in such a way that both the power supplies of the monitor apparatus and the image processing apparatus are turned off; and
wherein when anyone of the first, second, and third power supply switches is turned on, the controller section is configured to control both the power supplies of the monitor apparatus and the image processing apparatus in operation with each other, in such a way that both the power supplies of the monitor apparatus and the image processing apparatus are turned on.

3. The image display apparatus according to claim 1, wherein the controller section is configured to recognize when a specific monitor apparatus has been connected to the image processing apparatus, by receiving the linked authentication CEC vendor command from the connected monitor apparatus via the required interface.

4. The image display apparatus according to claim 1, wherein the required interface is an High-Definition Multimedia Interface (HDMI), and the monitor apparatus is configured to transmit the linked authentication CEO vendor command through an internal Consumer Electric Control (CEC) line of the HDMI.

5. An image display apparatus comprising:
a monitor apparatus configured to display images;
an image processing apparatus having a tuner configured to receive a compressed and encoded digital television signal, and configured to:
convert the compressed and encoded digital television signal received by the tuner into a decompressed and decoded image signal, and
output the decompressed and decoded image signal to the monitor apparatus via a required interface;
a first power supply switch arranged in the monitor apparatus;
a second power supply switch arranged in the image processing apparatus; and
a third power supply switch arranged in a remote controller configured to operate anyone of the monitor apparatus and the image processing apparatus;
wherein the monitor apparatus and the image processing apparatus are constructed in separate respective casings;
wherein the image processing apparatus includes a controller section configured to receive information indicating a state of power supply of the monitor apparatus via the interface;
wherein the monitor apparatus is configured to issue a linked authentication Consumer Electronics Control (CEC) vendor command to the image processing apparatus;
wherein the image processing apparatus is configured to issue a linked authentication CEC vendor command to the monitor processing apparatus;
wherein the monitor apparatus and the image processing apparatus are configured to operate in a linked operation mode,
wherein when the monitor apparatus and the image processing apparatus recognize the respectively issued linked authentication CEC vendor command, the monitor apparatus and the image processing apparatus are configured to switch to linked operation mode;
wherein when the monitor apparatus and the image processing apparatus are in linked operation mode, upon power on operation of anyone of the first, second, and third power supply switches, the controller section:

transmits a power on command in response to the power on operation to the monitor apparatus via the required interface to turn on the monitor apparatus, issues an inquiring command to the monitor apparatus to obtain information on the power state of the monitor apparatus, receives from the monitor apparatus information on a state of power supply of the monitor apparatus controlled by the power on command, which is obtained in response to the inquiring command, and ensures that the monitor apparatus has been turned on based on the received information on the state of power supply of the monitor apparatus, and then controls turning on the power supply of the image processing apparatus in such a way that the state of power supply of the image processing apparatus coincides with the state of power supply of the monitor apparatus shown by the information on the state of power supply received from the monitor apparatus.

6. The image display apparatus according to claim 5, wherein the controller section executes control such that when the power supply of either the monitor apparatus or the image processing apparatus is on, the power supply of the other apparatus is also turned on, and when the power supply of either apparatus is off, the power supply of the other apparatus is also turned off.

7. The image display apparatus according to claim 5, wherein the monitor apparatus and the image processing apparatus are constructed such that linked authentication CEC vendor command corresponding to each apparatus can be transmitted and received between both apparatuses via the interface, and control of the power supplies is permitted when either one or both of the two apparatuses are authenticated with the linked authentication CEC vendor command.

8. An image display apparatus comprising:

a monitor apparatus configured to display images;

an image processing apparatus that has a tuner configured to receive a compressed and encoded digital television signal, and a controller section, the image processing apparatus configured to:
  convert the compressed and encoded digital television signal received by the tuner into a decompressed and decoded image signal, and
  output the decompressed and decoded image signal to the monitor apparatus via a required interface;

a first power supply switch arranged in the monitor apparatus;

a second power supply switch arranged in the image processing apparatus;

a third power supply switch arranged in a remote controller, configured to operate anyone of the monitor apparatus and the image processing apparatus; and wherein the monitor apparatus and the image processing apparatus are constructed in separate respective casings;

wherein the monitor apparatus is configured to issue a linked authentication Consumer Electronics Control (CEC) vendor command to the image processing apparatus;

wherein the image processing apparatus is configured to issue a linked authentication CEO vendor command to the monitor processing apparatus;

wherein the monitor apparatus and the image processing apparatus are configured to operate in a linked operation mode, wherein when the monitor apparatus and the image processing apparatus recognize the respectively issued linked authentication CEC vendor command, the monitor apparatus and the image processing apparatus are configured to switch to linked operation mode;

wherein when the monitor apparatus and the image processing apparatus are in linked operation mode, upon power on operation of anyone of the first, second, and third power supply switches, the controller section:

transmits a power on command in response to the power on operation to the monitor apparatus via the required interface to turn on the monitor apparatus, issues an inquiring command to the monitor apparatus to obtain information on the power state of the monitor apparatus, receives from the monitor apparatus information on a state of power supply of the monitor apparatus controlled by the power on command, which is obtained in response to the inquiring command, ensures that the monitor apparatus has been turned on based on the received information on the state of power supply of the monitor apparatus, and then controls turning on the image processing apparatus, and thereby, even when anyone of the first, second, and third power supply switches are operated, the controller section controls the power supply of the monitor apparatus and the power supply of the image processing apparatus in operation with each other, in such a way that both power supply states become equal.

\* \* \* \* \*